United States Patent [19]

Jones

[11] Patent Number: 4,976,579
[45] Date of Patent: Dec. 11, 1990

[54] FLASK ASSEMBLY FOR CONTAMINATED OBJECTS

[75] Inventor: James Jones, Warrington, United Kingdom

[73] Assignee: British Nuclear Fuels plc, Warrington, England

[21] Appl. No.: 337,057

[22] Filed: Apr. 12, 1989

[30] Foreign Application Priority Data

Apr. 21, 1988 [GB] United Kingdom ................. 8809433

[51] Int. Cl.$^5$ .............................................. G21F 5/00
[52] U.S. Cl. .................................... 414/146; 414/292
[58] Field of Search ................ 414/146, 288, 292, 293

[56] References Cited

U.S. PATENT DOCUMENTS

| | | | |
|---|---|---|---|
| 4,055,508 | 10/1977 | Yoli et al. | 414/146 X |
| 4,259,153 | 3/1981 | Pryamilov et al. | 414/146 X |
| 4,260,312 | 4/1981 | Hackney | 414/292 |
| 4,534,389 | 8/1985 | Tullis | 414/292 X |
| 4,643,869 | 2/1987 | Heimerl et al. | 414/146 X |
| 4,668,153 | 5/1987 | Sperinck et al. | 414/146 X |
| 4,674,939 | 6/1987 | Maney et al. | 414/292 |
| 4,732,527 | 3/1988 | Conche | 414/146 X |

FOREIGN PATENT DOCUMENTS

| | | |
|---|---|---|
| 0202958 | 11/1986 | European Pat. Off. . |
| 2637751 | 2/1978 | Fed. Rep. of Germany . |
| 54-0148999 | 11/1979 | Japan ................................... 414/146 |
| 0663107 | 11/1987 | Switzerland . |
| 1119621 | 7/1968 | United Kingdom . |
| 1521204 | 8/1978 | United Kingdom . |
| 2175238 | 11/1986 | United Kingdom . |

Primary Examiner—Robert J. Spar
Assistant Examiner—John Vanden Bosche
Attorney, Agent, or Firm—William R. Hinds

[57] ABSTRACT

A flask assembly for the transfer of objects, in particular objects contaminated by radioactivity, into and out of an enclosure. The assembly includes a levelling system to sit over a posting port in an enclosure for the objects and which supports a stool assembly. The stool assembly includes a lower gamma gate which cooperates with an upper gamma gate on a flask body which is removably mounted on the stool assembly. The flask body carries a winch system for flasking objects through the posting port. A shock absorber unit is housed within the stool assembly.

5 Claims, 2 Drawing Sheets

FLASK ASSEMBLY FOR CONTAMINATED OBJECTS

The present invention concerns a flask assembly for use in the transfer of contaminated objects to and from an enclosure. In particular the invention concerns an assembly for flasking objects which have been subjected to radioactivity.

FEATURES AND ASPECTS OF THE INVENTION

According to the present invention a flask assembly for the transfer of objects into and out of an enclosure comprises a levelling device adapted to sit over a posting port in the enclosure and supporting a stool, a gamma gate at the end of the stool remote from the levelling device, a flask body mountable on the stool and having a gamma gate cooperable with the gamma gate on the stool, winch means on the flask body for flasking objects through the posting port, and a shock absorber unit housed within the stool.

A control unit forming a part of the flask assembly can be provided at a position remote from the flask body.

DESCRIPTION OF THE DRAWINGS

The invention will be described further, by way of example, with reference to the accompanying drawings, in which.

DESCRIPTION OF THE PREFERRED EMBODIMENT

Figure 1:
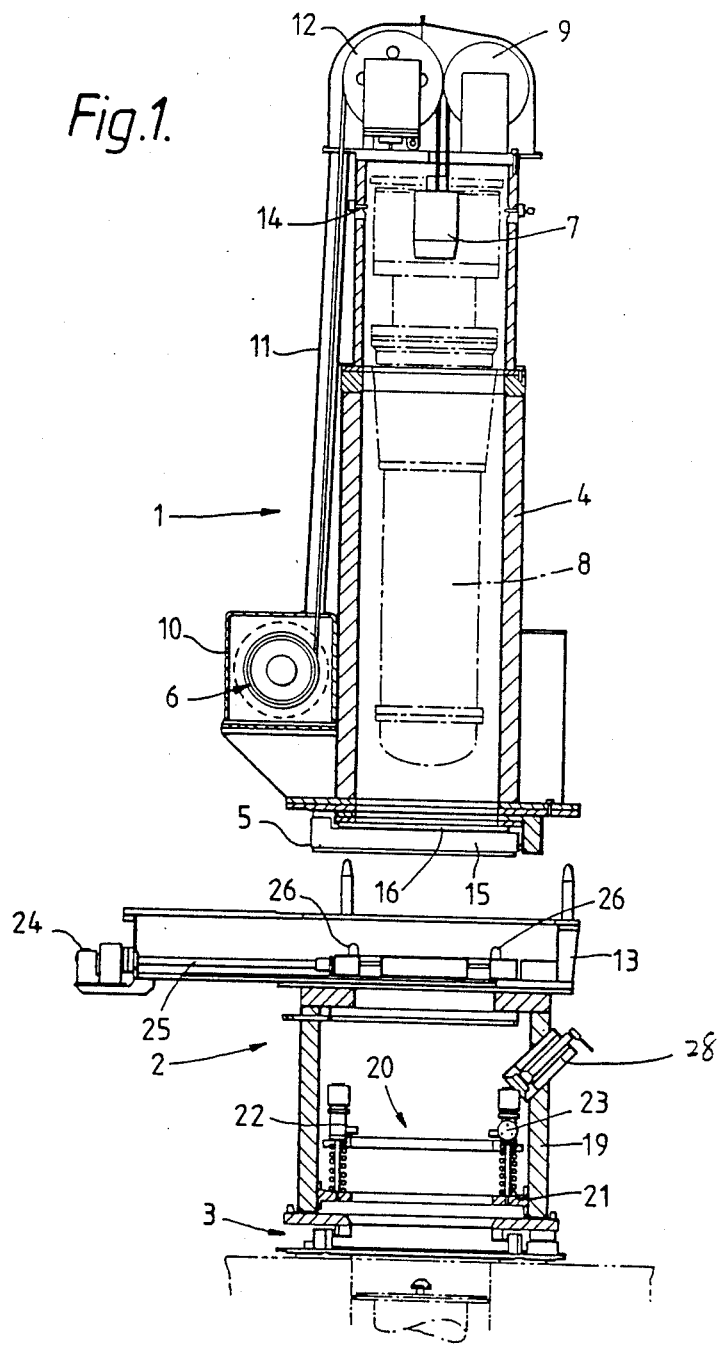
FIG. 1 is a sectional elevation of a flask assembly for the transfer of radioactive material into and out of an enclosure.

The assembly in FIG. 1 is for use in the remote transfer of materials to and from a radioactive zone or plant. The apparatus comprises a number of units, namely, a main flask body and upper gamma gate 1; a lower gamma gate and stool assembly 2; and a levelling system 3.

The main flask body is constructed from a lead filled fabricated steel sandwich 4 and has an integral gamma gate 5 and a winch mechanism 6. A solenoid operated grab 7 is fitted to the winch rope for automatic connection to an item being flasked, for example a filter unit 8. The control cable for the grab is wound up and down by a spring-operated cable reeling drum 9 fitted with slip rings. The drum 9 is mounted externally on top of the flask body.

A winch drum in a housing 10 is mounted externally on a side of the flask body. The winch drum is driven by a geared motor unit through a torque limiter to protect the winch against overloads. The geared motor is provided with a brake to prevent unwinding of the rope when the power supply is off.

An enclosed channel 11 is provided for the rope on the side of the flask body. The rope passes over an idler pulley 12 mounted on top of the flask body which is fitted with a load cell to register when the load is applied. A limit switch severs power to the winch drive when the grab 7 reaches its upper position and also inhibits movement of a lower gamma gate 13 until this switch is activated. This ensures that the gamma gates can only be operated when the grab 7 is at the top of a flask. A further limit switch will trip power to the winch drive if the first mentioned limit switch fails to arrest the movement of the drum.

An internal spray ring 14 is fitted to the upper end of the flask body to enable the internal walls to be washed down to aid decontamination.

Figure 2:
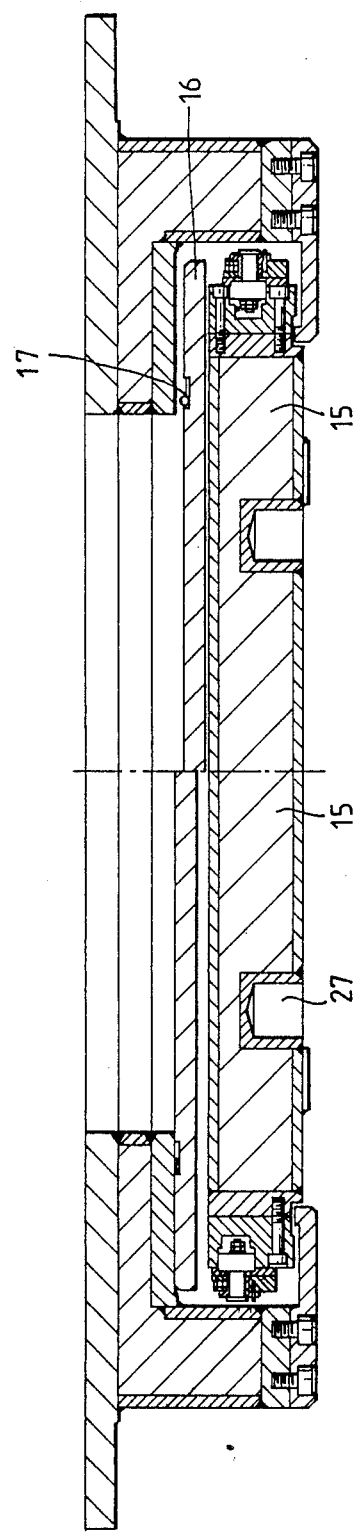
FIG. 2 shows an upper gamma gate forming a part of the flask assembly.

The upper gamma gate 5, which is bolted to the flask body, comprises a lead filled member 15 carrying a spring-loaded plate 16 having a seal 17 fitted to its upper surface. When the gate 5 is closed it contacts a mechanical stop which causes the plate 16 to move upwards into sealing engagement with the bottom of the flask body. In FIG. 2, the plate 16 is in two portions, the left hand portion showing the plate in a closed position and the right hand portion showing the plate open.

The upper gate 5 is coupled for movement to the lower gate 13 and consequently the movement of gate 5 only takes place when the flask body is positioned on the lower gate. The gate 13 is locked in position by a locking pin lever mounted on the flask. Proximity switches detect and interlock the gate movements and transmit the information to a control panel located at a position remote from the assembly.

The stool assembly 2 is formed from stainless steel plate and lead to provide a biological shield 19. The stool houses a shock absorber unit 20 which serves to protect process pipes and the operating floor from excessive loads in the event of an object falling from within the flask.

The shock absorber unit 20 comprises a plurality, conveniently five, shock absorbers mounted on a common support ring 21 secured to the interior of the stool. In operation and in the event of a load falling within the flask, the load would be restrained by spring-loaded latches 22. Under normal operating conditions the load within the flask for transfer through the port will be lowered on to the latches to thereby depress the shock absorbers. As soon as the shock absorbers reach their limit of travel a signal from the control unit will terminate the hoist lower function. The load is then raised clear of the shock absorbers to enable the latches 22 to be raised by individual rotary solenoids 23. This enables the load to pass through the shock absorbers. Upon de-energisation of the solenoids, the latches return to their original positions under action of return springs. A TV camera 28 can be mounted in the stool assembly and a monitor in the control unit to view lowering onto latches/shock absorbers.

Upon lifting a load out of the enclosure, the load will raise the latches and the return springs will return the latches on passage of the load. The stool can be fitted with a wash ring to aid decontamination.

The lower gamma gate 13 is driven within its housing by a worm geared brake motor and torque limiter 24 via a leadscrew and nut 25. The gate is opened and closed remotely from the control unit. Proximity switches mounted in the gate housing switch the motor at the limits of travel.

The lower gamma gate drives the upper gamma gate, the interconnection being achieved by co-operating dowels 26 and dowel holes 27 in the two gates.

An interlock is provided to prevent opening of the bottom gate when the flask is not in its operative position at the posting port.

The levelling system 3 serves two functions. First, it locates the stool unit concentric with the article or object being flasked. Second, it levels the flask assembly so that the flask centre line is vertical when the assembly is sitting on an uneven floor. Jacking can be performed by three commercial levelators. Seals are provided to prevent break in containment during jacking operations.

The control panel, not shown, can be a free-standing unit having castors for ease of movement and having means engageable by a crane for lifting as and when required. The control panel is located at a distance from the flask in order to reduce risk of contamination by operatives. All operational functions are performed at the control unit. As the flask assembly is operated from the control unit with a minimum of direct operator handling it is possible to reduce the amount and thickness of shielding with a consequent reduction in weight of the flask assembly. This assists floor loadings and crane requirements.

I claim:

1. A flask assembly for the transfer of objects into and out of an enclosure comprising a levelling system adapted to sit over a posting port in the enclosure, a stool assembly positioned on the levelling system, a lower gamma gate at the end of the stool assembly remote from the levelling system, a flask body removably mounted on the stool assembly, an upper gamma gate on the flask body cooperable with the lower gamma gate on the stool assembly, winch means on the flask body for flasking objects through the posting port, and a shock absorber unit housed within the stool assembly.

2. A flask assembly according to claim 1 including drive means for moving the lower gamma gate.

3. A flask assembly according to claim 2 including a drive interconnection between the lower and upper gamma gates.

4. A flask assembly according to claim 3 in which the drive interconnection comprises cooperating dowels and dowel holes in the two gates.

5. A flask assembly according to claim 1 in which the shock absorber unit comprises a plurality of shock absorbers mounted on a support ring secured to the interior of the stool assembly.

* * * * *